(12) United States Patent
Myint

(10) Patent No.: US 6,575,826 B2
(45) Date of Patent: Jun. 10, 2003

(54) SECURITY AIR VENT

(76) Inventor: Tom H. Myint, 64 Abbeywood Trail, Don Mills, Toronto, Ont. (CA), M3B 2B5

( * ) Notice: Subject to any disclaimer, the term of this patent is extended or adjusted under 35 U.S.C. 154(b) by 0 days.

(21) Appl. No.: 10/038,420

(22) Filed: Jan. 7, 2002

(65) Prior Publication Data

US 2003/0050006 A1 Mar. 13, 2003

(51) Int. Cl.[7] .................................................. F24F 7/00
(52) U.S. Cl. ...................................... 454/276; 454/277
(58) Field of Search ................................. 454/277, 276, 454/275

(56) References Cited

U.S. PATENT DOCUMENTS

| | | | | |
|---|---|---|---|---|
| 3,426,667 A | * | 2/1969 | Johnson | 454/275 |
| 3,643,584 A | * | 2/1972 | Sheppard | 454/275 |
| 4,936,400 A | * | 6/1990 | Blumbach et al. | 180/68.1 |
| 5,133,692 A | * | 7/1992 | Koop | 454/282 |
| 5,605,022 A | * | 2/1997 | Fulton | 454/365 |
| 6,283,852 B1 | * | 9/2001 | Igo | 454/365 |
| 6,286,273 B1 | * | 9/2001 | Villela et al. | 454/365 |

* cited by examiner

Primary Examiner—Harold Joyce
Assistant Examiner—Derek Boles

(57) ABSTRACT

Air vent for protecting the public potable water system against terrorism and sabotage. Conventional air vents allow the movement of air in and out of an enclosed reservoir structure but do not stop the penetration of liquids or solids. The present invention allows the movement of air but will not allow any liquids or solids to pass through the vent, even if these liquids or solids are being applied under pressure. This is accomplished by an energy dissipating arrangement of S-shape structural members.

4 Claims, 3 Drawing Sheets

SECURITY AIR VENT

TECHNICAL FIELD

The present invention relates to wall vents and, in particular, wall vents that can provide security for an enclosed water reservoir by allowing passage of air but prevent passage of liquids or solids that are applied with force or under pressure.

BACKGROUND OF THE INVENTION

Air vents are required on an enclosed water reservoir to permit the passing of air that is displaced from or sucked into the reservoir as its water level rises or falls. At present, enclosed water reservoirs are typically equipped with conventional louver vents that consist of straight blades that are fixed at a downward angle. Such vents prevent rain from contaminating the reservoir but do not adequately resist the penetration of liquids or solids if force or pressure is applied. The public potable water system requires better protection against terrorism and sabotage.

SUMMARY OF THE INVENTION

The present invention is a wall vent that allows movement of air but prevents the passage of liquids or solids even if such liquids or solids are applied with force or under pressure against it. The present invention's uses include use in potable water reservoirs to protect them against terrorism and sabotage.

The present invention has a design that dissipates the incoming energy of liquids or solids that strike the present invention from the exterior. The applied liquid or solid will likely drop and drain to the exterior upon striking the present invention's first barrier, which dissipates incoming energy. If the first barrier is passed because the applied liquid or solid maintains sufficient energy to strike the present invention's second barrier, then such liquid or solid will drop and drain to the exterior after striking the second barrier, which also dissipates incoming energy.

Existing vents do not have any structural elements that dissipate incoming energy to the extent of the present invention. Existing vents may protect against the passage of rain or other liquids or solids that fall downward, but they do not protect against the passage of liquids or solids that are applied directly sideways with force or under pressure.

DETAILED DESCRIPTION

Figure 1:
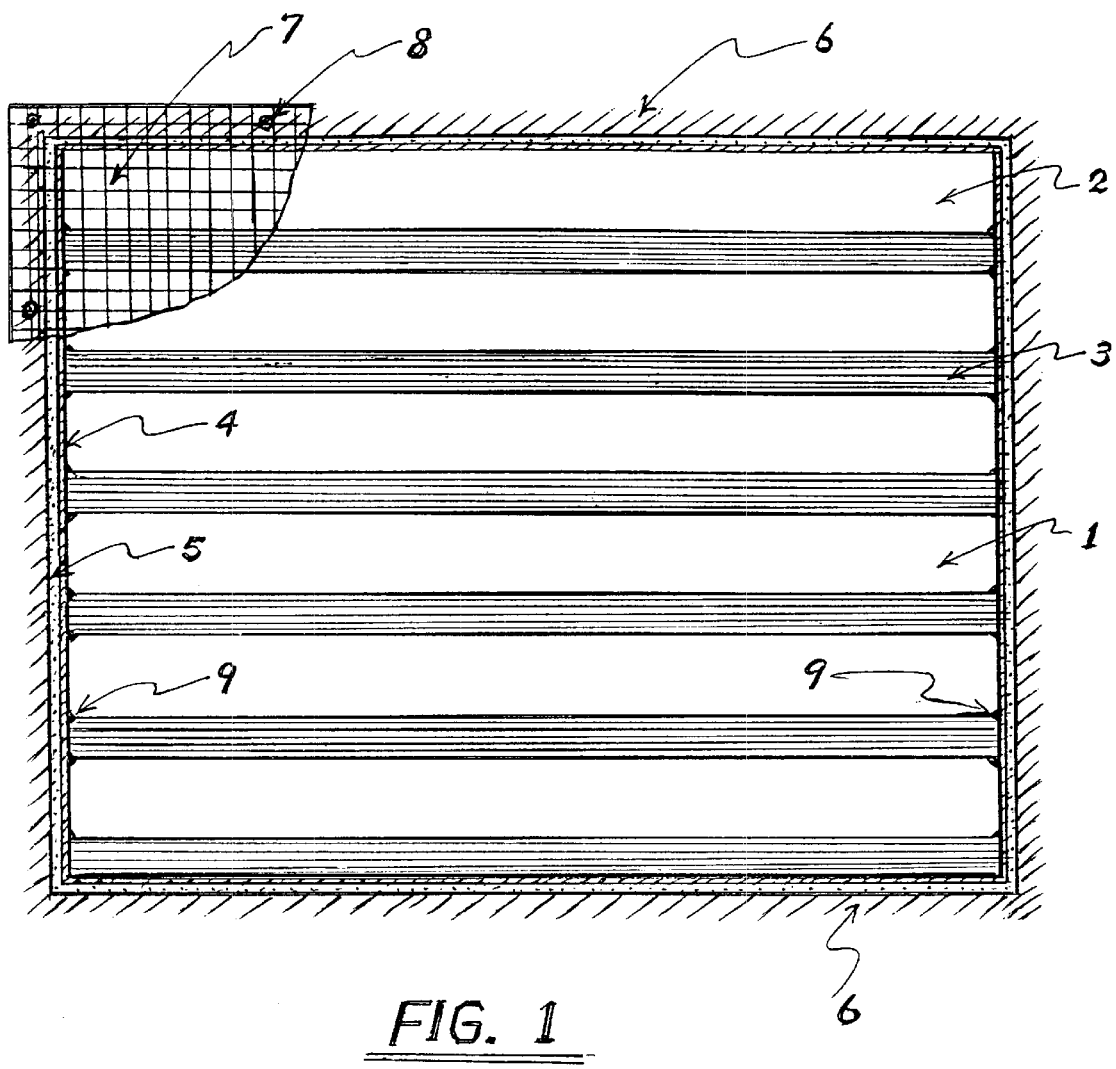
FIG. 1 is a front view of the present invention installed in a structural wall opening.
Figure 2:
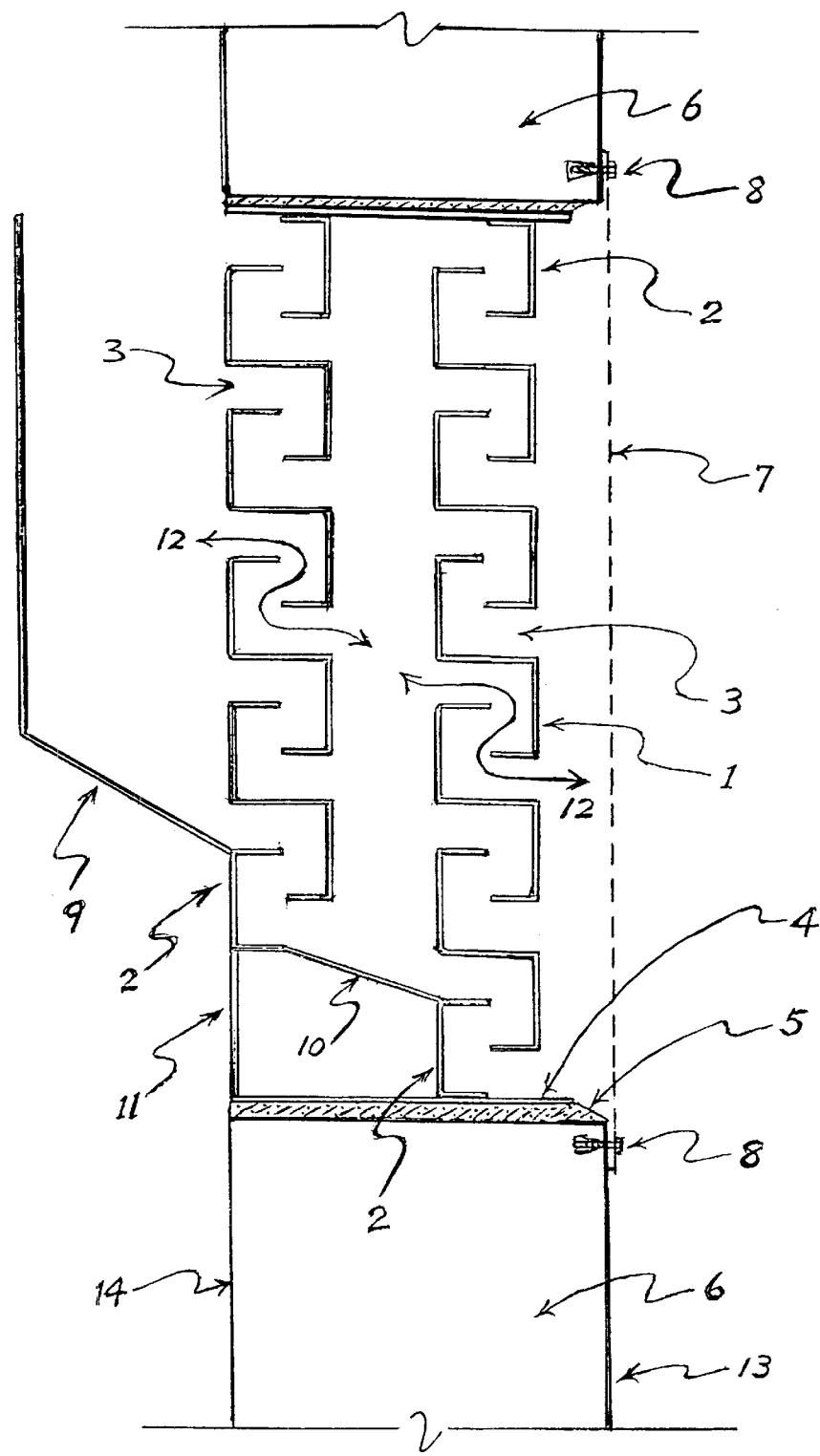
FIG. 2 is a vertical cross-sectional view of the present invention.

The present invention normally consists of a rectangle or square frame housing, 4 in FIGS. 1 and 2. The frame housing is usually anchored and secured to the sides of the wall opening, 6 in FIGS. 1 and 2, with cement grout or epoxy grout, 5 in FIGS. 1 and 2. In FIG. 2, 13 indicates the exterior of the wall and 14 indicates the interior of the wall.

Normally, the present invention requires only two sets of horizontal S-shape structural members, 1 in FIGS. 1 and 2, together with the four half S-shape members, 2 in FIGS. 1 and 2, located at top and bottom of the sections. These S-shape and half S-shape members are all welded at both ends to the housing at 9 in FIG. 1.

Figure 3:
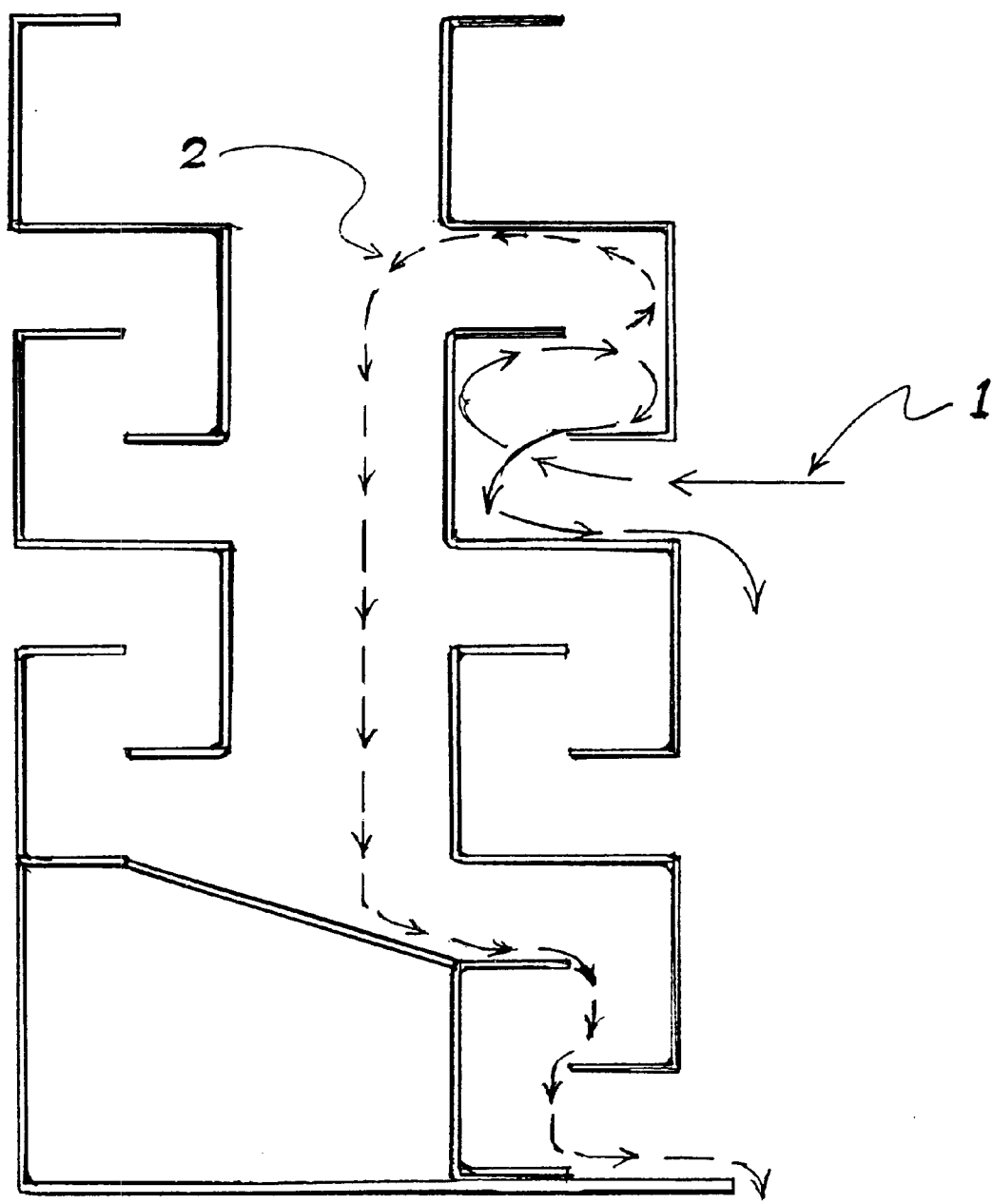
FIG. 3 is an enlarged partial vertical cross-sectional view of the present invention illustrating the dissipation of incoming energy.

The front, outer set of S-shape members form the first line of defence where all or most the incoming energy of applied liquids or solids will be dissipated and the liquids or solids drop and drain as indicated in 1 of FIG. 3. If liquids or solids are applied with sufficient force, after the initial dissipation and removal as shown in 1 of FIG. 3, some liquid or solid residue may bounce into the open space between the two sets of S-shape members and subsequently drop and drain outside the vent as indicated in 2 in FIG. 3. The slope 10 in FIG. 2 drains the open space. The back, inner set of S-shape members form the second line of defence and stop any liquid or solid that penetrate the front, outer set of S-shape members in the same manner as such front, outer set.

The present invention functions as a normal air vent. It permits free movement of air through the vent space 3 in FIGS. 1 and 2 with the airflow pattern indicated by 12 in FIG. 2.

For high security locations, an inner safety-reservoir may be added instead of the draining slope at 9 in FIG. 2. Such hidden, inner safety-reservoir foils an attack that blocks the draining or dropping of liquid or solid from the present invention because the inner reservoir of hidden capacity must be filled by the liquid or solid before the attack's target reservoir is reached. 7 and 8 in FIGS. 1 and 2 indicate the bird screen and anchor bolts installed on the exterior of the prevent invention to prevent entry by animals and birds. 11 in FIG. 2 indicates a structural element that adds rigidity to the present invention.

What is claimed is:

1. A vent for installation in a vertical wall, which vent comprises:
    a rectangular or square housing;
    an outer set of members connected to said housing having:
        a top member with a backwards-C-shaped cross-section if the exterior is on the right with such backwards-C-shape having:
            (a) an upper horizontal limb of one unit in length;
            (b) a vertical limb of two units in length; and
            (c) a lower horizontal limb of one unit in length;
        a bottom member with a C-shaped cross-section if the exterior is on the right with such C-shape having:
            (a) an upper horizontal limb of one unit in length;
            (b) a vertical limb of two units in length; and
            (c) a lower horizontal limb of one unit in length;
        several middle members with an S-shaped cross-section with such S-shape having the shape and size reached by attaching said C-shape with said backwards-C-shape by the tips of their bottom and top horizontal limbs respectively;
        a first such S-shaped member below the said backwards-C-shaped member except overlapping it by one unit in length;

each subsequent such S-shaped member below the previous and above S-shaped member except overlapping it by one unit in length;

the said C-shaped member below the last such S-shaped member except overlapping it by one unit in length; and air passages between members with a backwards-S-shaped cross section;

an inner set of members connected to said housing located 2 units from said outer set of members and being identical in shape to said outer set of members except that said inner set of members is three units shorter and it is raised above the bottom of the housing by 3 units in length; and a straight member connected to said housing that connects the bottom tip of the C-shaped member of said inner set of members to the top-left corner of the C-shaped member of said outer set of members when such latter C-shaped member is viewed cross-sectionally.

2. The vent of claim 1 wherein the inner set of members is located further than 2 unit from the outer set of members.

3. The vent of claim 1 wherein an open-top reservoir compartment, comprising three side panels and bottom plate, is connected to the C-shaped member of the inner set of members such that the top of said compartment is flush with the top of said C-shaped member.

4. The vent of claim 1 wherein a wire mesh screen is connected to the outer side of the wall to cover the vent.

* * * * *